United States Patent
Wang

(10) Patent No.: US 8,028,595 B2
(45) Date of Patent: Oct. 4, 2011

(54) ADJUSTING DEVICE FOR SEATING AND RECLINING FURNITURE

(76) Inventor: Kuo-An Wang, Tainan (TW)

( * ) Notice: Subject to any disclaimer, the term of this patent is extended or adjusted under 35 U.S.C. 154(b) by 402 days.

(21) Appl. No.: 12/393,132

(22) Filed: Feb. 26, 2009

(65) Prior Publication Data

US 2009/0151488 A1 Jun. 18, 2009

(51) Int. Cl.
*F16H 3/06* (2006.01)
*F16H 27/02* (2006.01)
*F16H 29/02* (2006.01)
*F16H 29/20* (2006.01)

(52) U.S. Cl. .................. 74/89.44; 74/89.4; 74/89.33

(58) Field of Classification Search .............. 74/89.23, 74/89.32, 89.34, 89.41, 89.44; 384/13; 184/5, 184/100, 102

See application file for complete search history.

(56) References Cited

U.S. PATENT DOCUMENTS

| | | | |
|---|---|---|---|
| 5,927,144 | A | 7/1999 | Koch |
| 6,655,225 | B1 | 12/2003 | Nagai et al. |
| 6,756,707 | B2 * | 6/2004 | Hochhalter et al. ............ 310/20 |
| 6,848,327 | B2 | 2/2005 | Nagai et al. |
| 2006/0207359 | A1 * | 9/2006 | Kowalski ...................... 74/89.23 |
| 2006/0230849 | A1 * | 10/2006 | Yabe ............................. 74/89.23 |
| 2008/0019620 | A1 * | 1/2008 | Vierheilig et al. .............. 384/13 |
| 2008/0019621 | A1 * | 1/2008 | Vierheilig et al. .............. 384/13 |

FOREIGN PATENT DOCUMENTS

| | | |
|---|---|---|
| CN | 1161638 A | 10/1997 |
| CN | 1174303 A | 2/1998 |

* cited by examiner

*Primary Examiner* — Richard W Ridley
*Assistant Examiner* — Keith Minter
(74) *Attorney, Agent, or Firm* — Alan Kamrath; Kamrath & Associates PA

(57) ABSTRACT

An adjusting device for seating and reclining furniture includes a basis case, a screw rotatable axis, a guide area, an adjuster and a side cover. A notching is set at the upper end face of the guide area. A slider inside of the adjuster is combined with the upper wall of a perforating in the guide area by a connection portion. The width of the connection portion is set corresponding to the width of the notching of the guide area, and a perforated panel is set at the center of the connection portion to make a fender board impenetrate. The fender board may shield the notching of the guide area. A chamber is set in the upper end face of the adjuster corresponding to the position of the perforated panel from top to bottom. The chamber may hold a felt containing lubricating oil. There is a bearing chamber in the inner wall of the side cover. The bearing chamber may make the bearings embed in, and a bearing are pivoted and combined with the end of the screw rotatable axis.

3 Claims, 6 Drawing Sheets

ADJUSTING DEVICE FOR SEATING AND RECLINING FURNITURE

BACKGROUND OF THE INVENTION

1. Field of the Invention

The present invention relates to a seating and reclining furniture, and more particularly to an adjusting device for seating and reclining furniture.

2. Description of the Prior Art

U.S. Pat. No. 5,927,144 discloses that a device for adjusting parts of seating and reclining furniture includes a basic housing for accepting a mechanism for driving a spindle fixed in position in the basic housing in a rotating manner, and a motor flanged to the side of the basic housing and connected to the mechanism, an accepting device for connection to a holding device and an adjuster for adjusting the movable part of the seating or reclining furniture being provided on the basic housing. In order to create a compact drive for parts of seating and reclining furniture, preferably for adjustable chairs, in which the length of the housing is independent of the stroke length of the drive to be realized, the spindle is surrounded by a two-part guide section connected to the basic housing, a slit being kept free between the two parts of the guide section through which a nut, guided by the spindle in a movable and non-twisting manner within the guide sections, is connected with the adjuster. In this context, the adjuster can be designed as a slider surrounding the outside of the guide sections in a form-fitting manner.

However, such a guide area are made of two aluminum-extruded rods by using two sets of molds, increasing production cost and lowering structure strength. Besides, the spindle is dipped with lubricating oil to adhere cotton fibers and dusts thereon, lowering service life of the spindle.

The present invention has arisen to mitigate and/or obviate the afore-described disadvantages.

SUMMARY OF THE INVENTION

The primary object of the present invention is to provide an adjusting device for seating and reclining furniture of which the guide area is made of a single aluminum-extruded rod by using only one set of mold to lower production cost and enhance structure strength.

Another object of the present invention is to provide an adjusting device for seating and reclining furniture of which the fender board of the adjuster is used to shield the notching of the guide area to prevent cotton fiber and dust fall into the guide area through the notching, and the felt of the adjuster can add lubricating oil to the operating screw rotatable axis and sweep the cotton fiber and dust attached on the screw rotatable axis away.

To obtain the above objective, an adjusting device for seating and reclining furniture provided by the present invention comprises: a basis case having a driving device disposed therein, a screw rotatable axis, a guide area, an adjuster and a side cover, wherein the basis case includes a motor connected to a side thereof;

the screw rotatable axis includes one end mounted in the basis case and another end axially coupled with the side cover, the screw rotatable axis is driven to rotate by the motor;

the guide area includes one end fixed in the basis case and another end connected with the side cover, and the guide area surrounds an exterior of the screw rotatable axis, and a notching is set at the upper end face of the guide area;

a slider inside of the adjuster is combined with the upper wall of a perforation in the guide area by a connection portion. The width of the connection portion is set corresponding to the width of the notching of the guide area, and a perforated panel is set at the center of the connection portion to allow a fender board to penetrate therein, a chamber is set in the upper end face of the adjuster corresponding to the position of the perforated panel from top to bottom. The chamber may hold a felt containing lubricating oil;

the slider includes a screw hole provided at a center thereof, the screw hole screws with the screw rotatable axis, and the guide area passes through the perforation.

The side cover is fitted in on end portion of the guide area, and there is a bearing chamber in the inner wall of the side cover. The bearing chamber contains a bearing embedded therein, and the bearing is combined with the end of the screw rotatable axis.

The guide area is made of a single aluminum-extruded rod by using only one set of mold to lower production cost and enhance structure strength. The fender board of the adjuster is used to shield the notching of the guide area to prevent cotton fiber and dust fall into the guide area through the notching, and the felt of the adjuster can add lubricating oil to the operating screw rotatable axis and sweep the cotton fiber and dust attached on the screw rotatable axis away.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
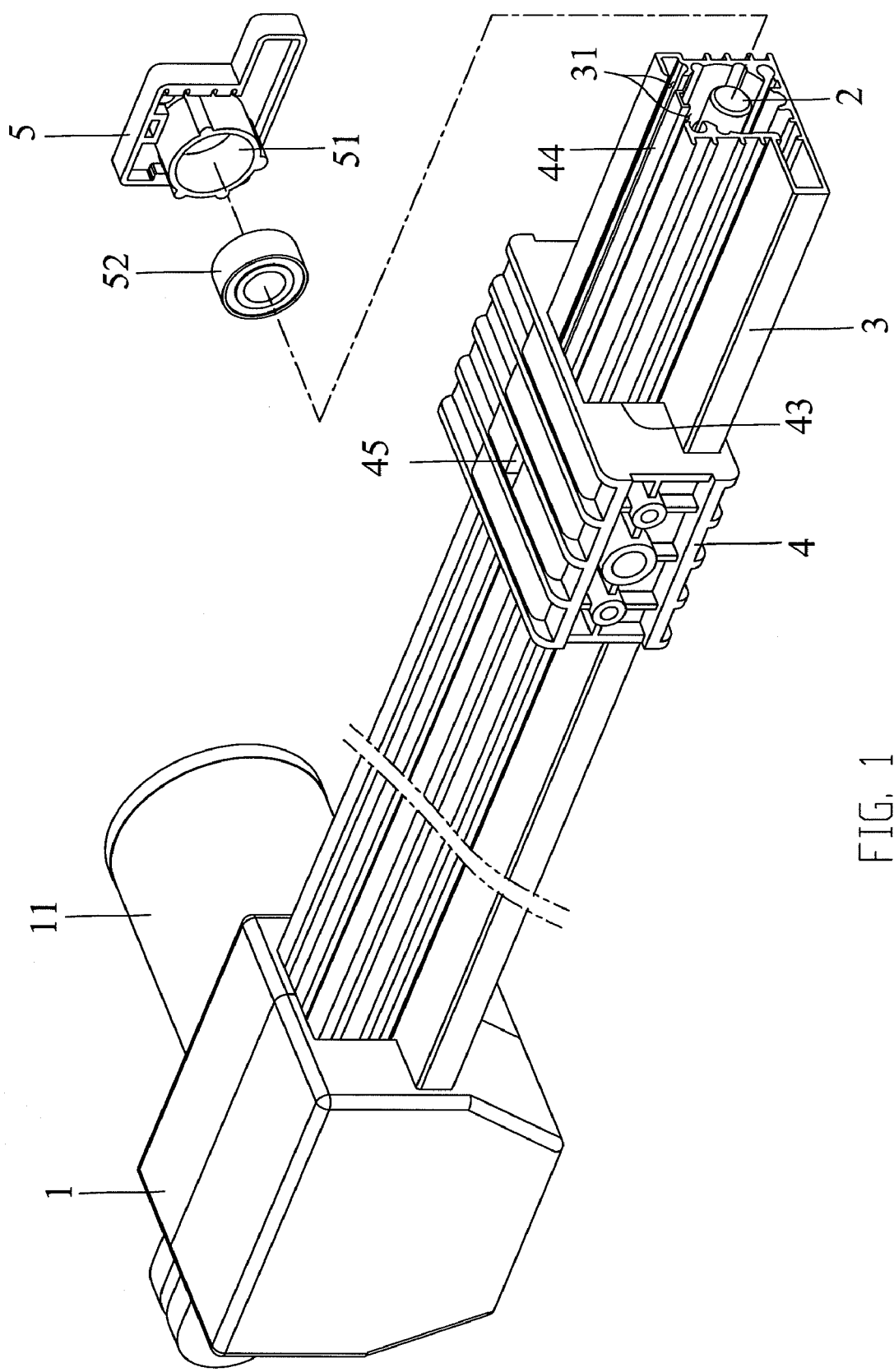
FIG. 1 is a perspective view of an adjusting device for seating and reclining furniture in accordance with the present invention.
Figure 2:
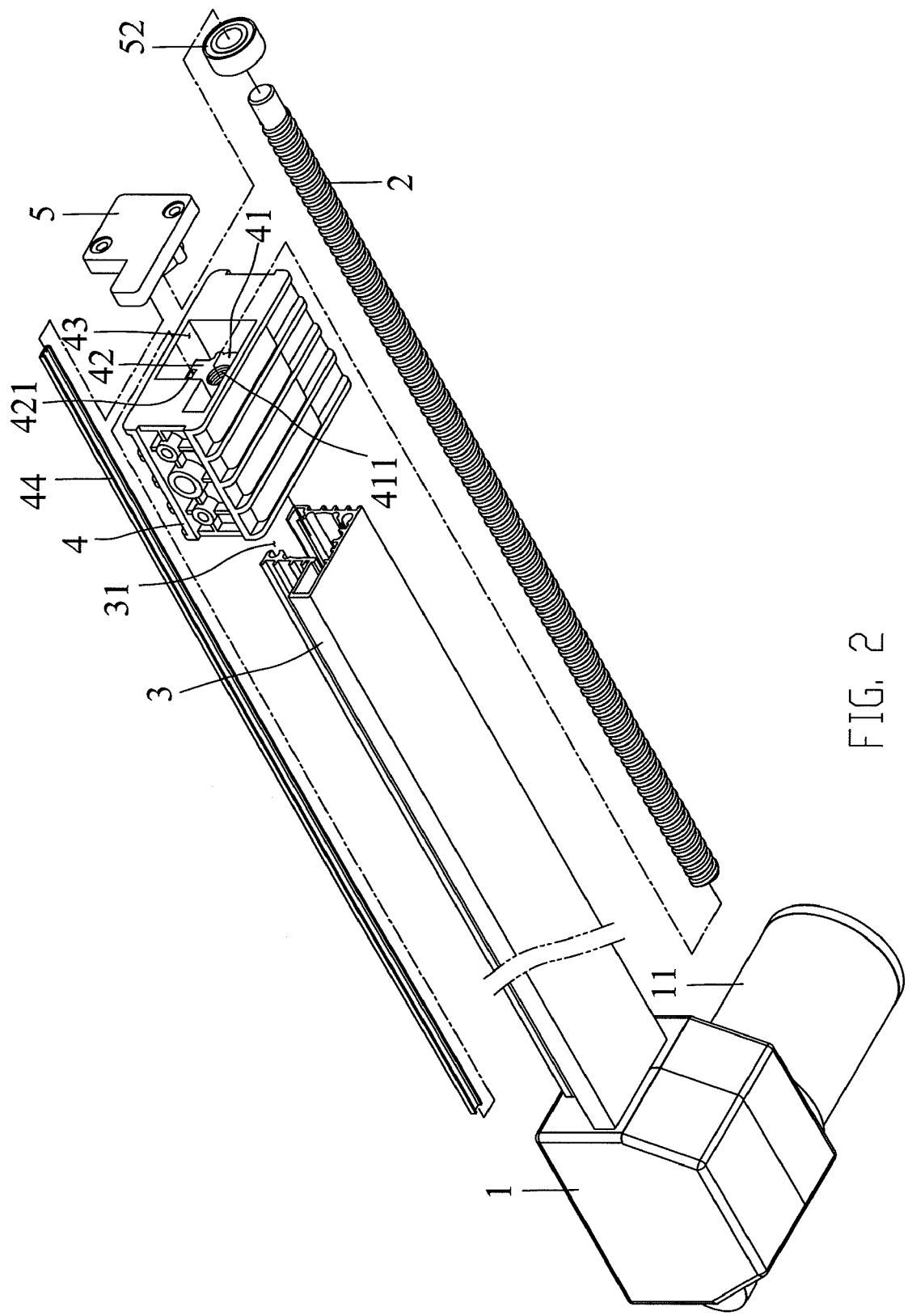
FIG. 2 is an exploded view of the adjusting device for seating and reclining furniture in accordance with the present invention.
Figure 3:
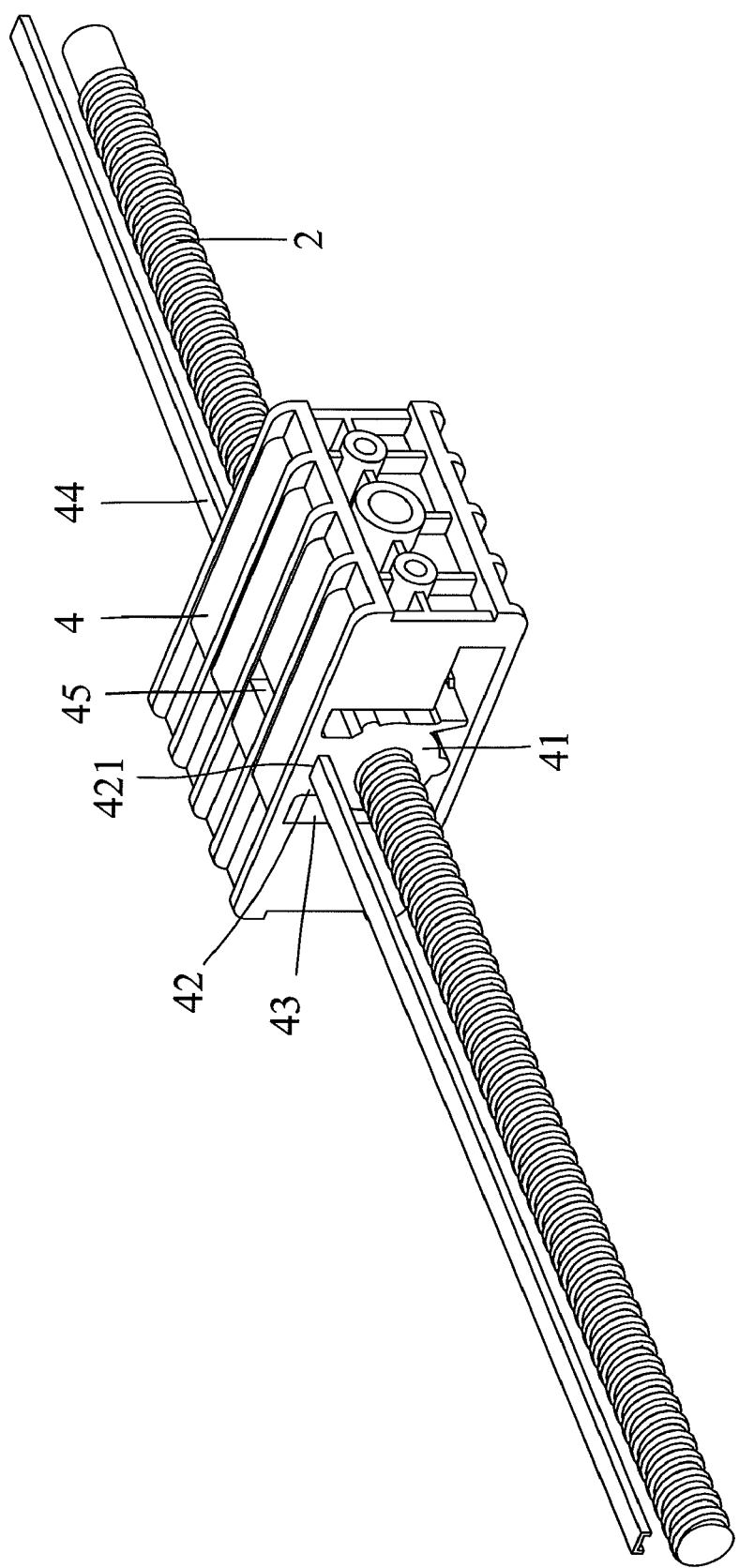
FIG. 3 is a perspective view showing a fender board and a screw rotatable axis passing through an adjuster in accordance with the present invention.
Figure 4:
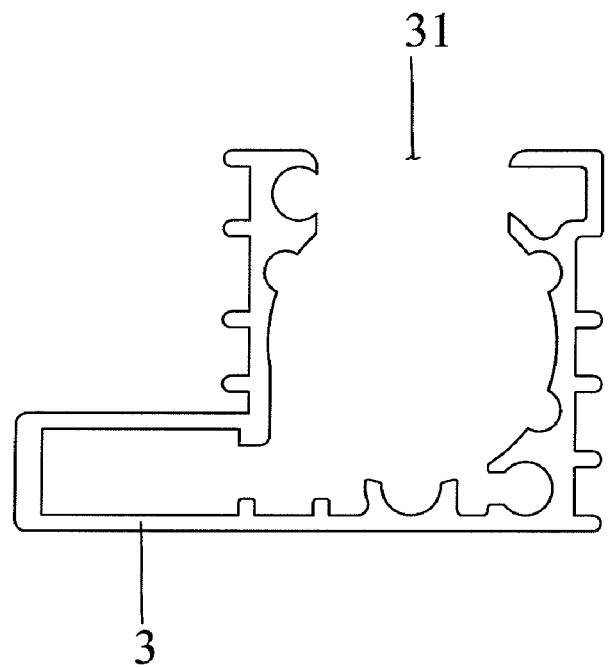
FIG. 4 is a side plane view of a guide area of the adjusting device for seating and reclining furniture in accordance with the present invention.
Figure 5:
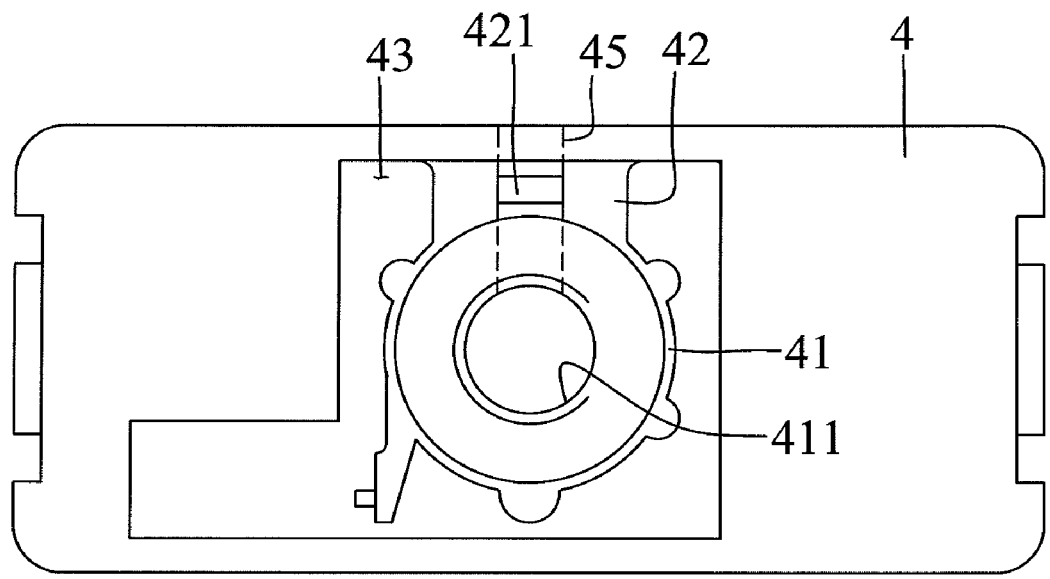
FIG. 5 is a side plane view of an adjuster of the adjusting device for seating and reclining furniture in accordance with the present invention.
Figure 6:
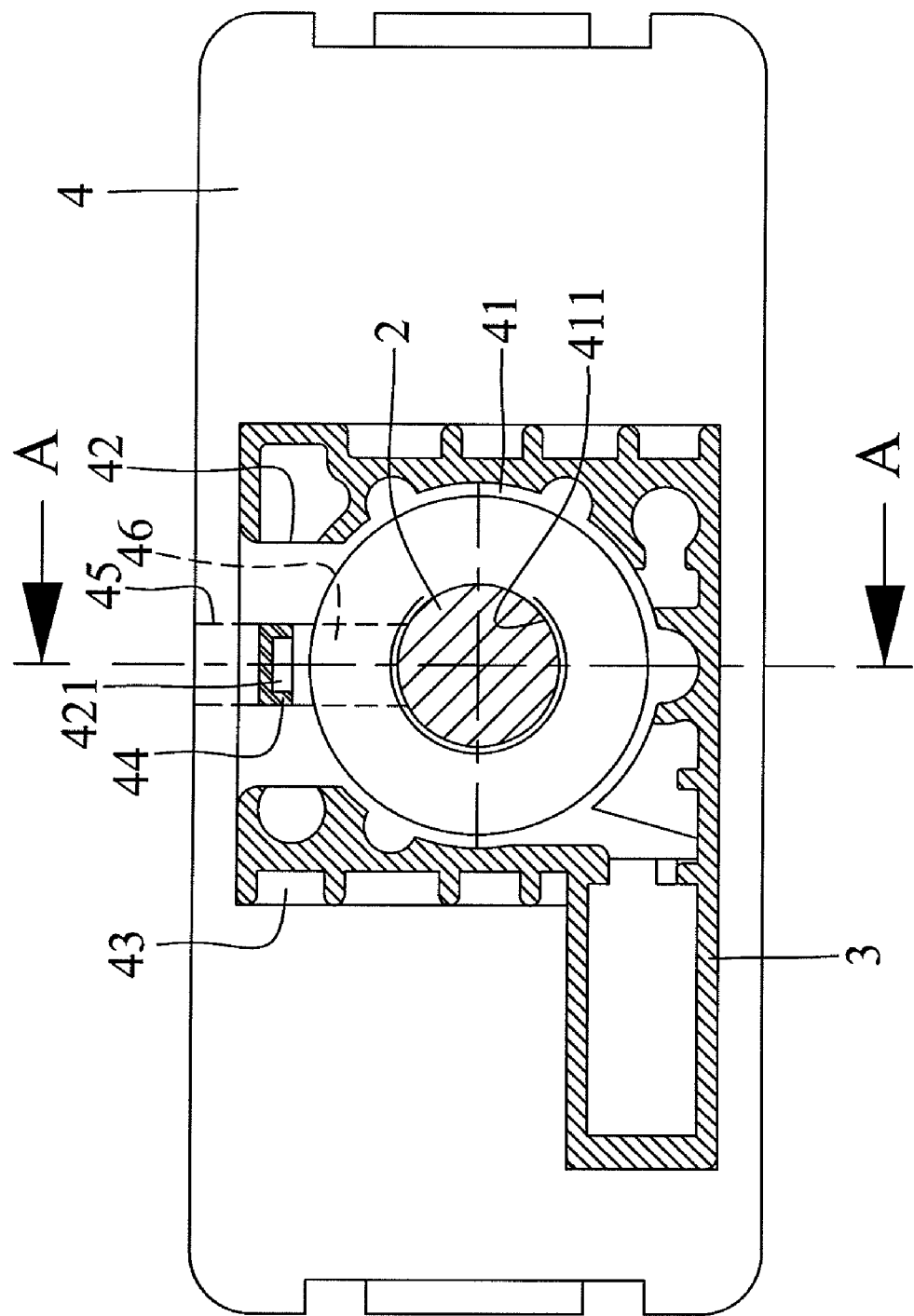
FIG. 6 is a cross sectional view showing the fender board, screw rotatable axis, and the guide area passing through the adjuster.
Figure 7:
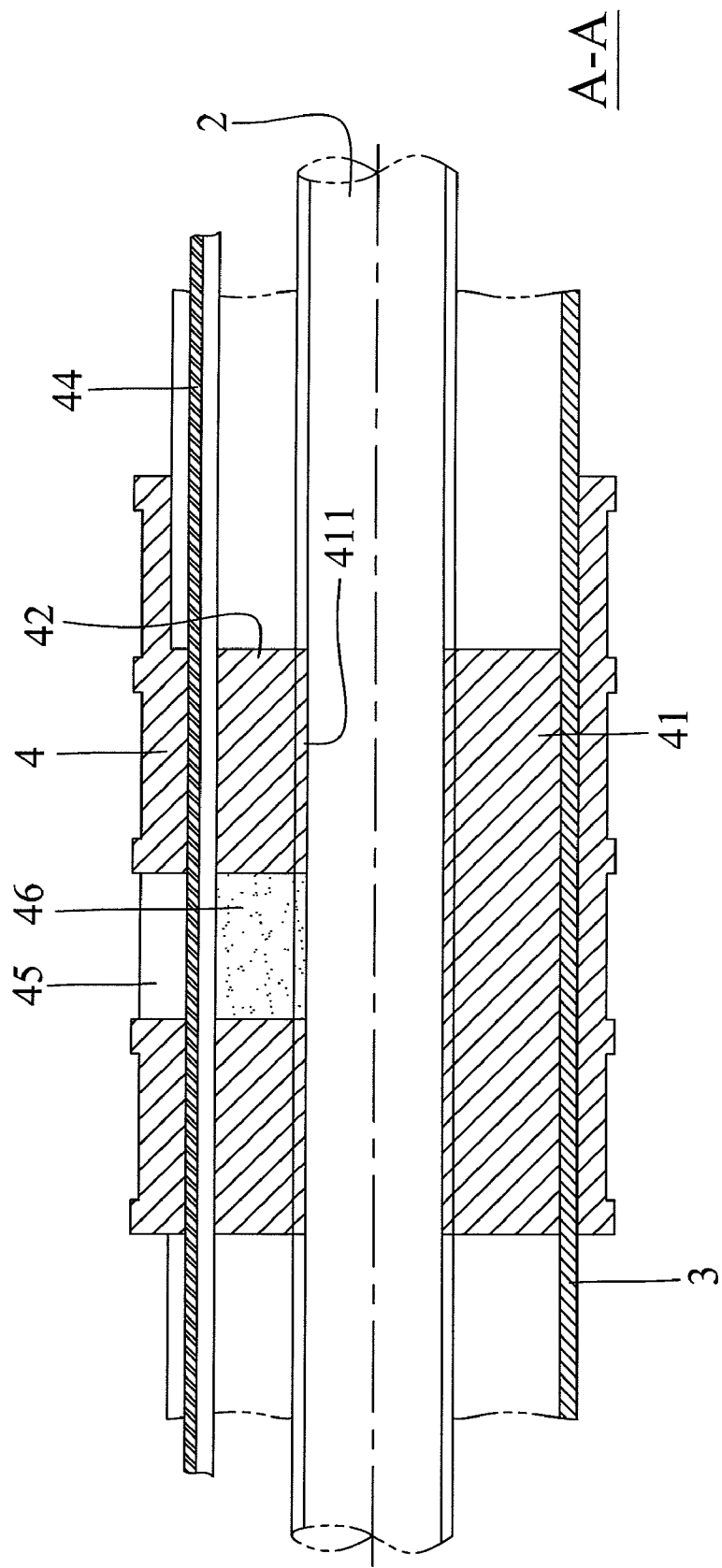
FIG. 7 is a cross sectional view taken along the lines A-A of FIG. 6.

Referring to FIGS. 1-2, an adjusting device for seating and reclining furniture in accordance with the present invention comprises a basis case 1 having a driving device disposed therein, a screw rotatable axis 2, a guide area 3, an adjuster 4 and a side cover 5, wherein the basis case 1 includes a motor 11 connected to a side thereof;

the screw rotatable axis 2 includes one end mounted in the basis case 1 and another end axially coupled with the side cover 5, the screw rotatable axis 2 is driven to rotate by the motor 11;

the guide area 3 includes one end fixed in the basis case 1 and another end connected with the side cover 5, and the guide area 3 surrounds an exterior of the screw rotatable axis 2, and a notching 31 is set at the upper end face of the guide area 3 (as illustrated in FIG. 4);

a slider 41 inside of the adjuster 4 is combined with the upper wall of a perforation 43 in the guide area 3 by a connection portion 42. The width of the connection portion 42 is set corresponding to the width of the notching 31 of the guide area 3 (as shown in FIG. 5), and a perforated panel 421 is set at the center of the connection portion 42 to allow a fender board 44 to penetrate therein, a chamber 45 is set in the upper end face of the adjuster 4 corresponding to the position of the perforated panel 421 from top to bottom. The chamber 45 may hold a felt 46 containing lubricating oil (as illustrated in FIGS. 6 and 7);

the slider 41 includes a screw hole 411 provided at a center thereof (as shown in FIGS. 2 and 5), the screw hole 411 screws with the crew rotatable axis 2 (as illustrated in FIG. 3), and the guide area 3 passes through to perforation 43 (as shown in FIG. 6).

With reference to FIGS. 1 and 3, the side cover 5 is fitted in on end portion of the guide area 3, and there is a bearing chamber 51 in the inner wall of the side cover 5. The bearing chamber 51 contains a bearing 52 embedded therein, and the bearing 52 is combined with the end of the screw rotatable axis 2.

The guide area 3 is made of a single aluminum-extruded rod by using only one set of mold to lower production cost and enhance structure strength. The fender board 44 of the adjuster 4 is used to shield the notching 31 of the guide area 3 to prevent cotton fiber and dust fall into the guide area 3 through the notching 31, and the felt 46 of the adjuster 4 can add lubricating oil to the operating screw rotatable axis 2 and sweep the cotton fiber and dust attached on the screw rotatable axis 2 away.

While we have shown and described various embodiments in accordance with the present invention, it is clear to those skilled in the art that further embodiments may be made without departing from the scope of the present invention.

What is claimed is:

1. An adjusting device for seating and reclining furniture comprising a basis case having a driving device disposed therein, a screw rotatable axis, a guide area, an adjuster and a side cover;

the basis case including a motor connected to a side thereof;

the screw rotatable axis including one end mounted in the basis case and another end axially coupled with the side cover, the screw rotatable axis being driven to rotate by the motor;

the guide area including one end fixed in the basis case and another end connected with the side cover, and the guide area surrounding an exterior of the screw rotatable axis;

the adjuster including a perforation formed therein which is penetrated by the guide area and the perforation having a slider with a screw hole arranged therein, the screw hole screwing with the screw rotatable axis; wherein the guide area is an integrally hollow rod and includes a notching is set at an upper end face of the guide area;

the slider inside of the adjuster is combined with an upper wall of the perforation in the guide area by a connection portion, the width of the connection portion is set corresponding to the width of the notching of the guide area, and a perforated panel is set at the center of the connection portion to allow a fender board to penetrate therein.

2. The adjusting device for seating and reclining furniture as claimed in claim 1, wherein a chamber is set in the upper end face of the adjuster corresponding to the position of the perforated panel from top to bottom so as to hold a felt containing lubricating oil.

3. The adjusting device for seating and reclining furniture as claimed in claim 1, wherein there is a bearing chamber in the inner wall of the side cover, the bearing chamber containing a bearing embedded therein, and the bearing is combined with the end of the screw rotatable axis.

* * * * *